United States Patent
Tan et al.

(10) Patent No.: US 6,458,481 B1
(45) Date of Patent: Oct. 1, 2002

(54) TOLERANCE AND SIZE ADAPTIVE SPACER FOR SPACING A BATTERY CELL

(75) Inventors: Wiling Tan, Duluth; William C. Phelps, III; Randall P. Chambers, both of Lawrenceville, all of GA (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/570,745

(22) Filed: May 13, 2000

(51) Int. Cl.[7] .............................. H01M 6/30; H01M 2/04
(52) U.S. Cl. ..................... 429/100; 361/752; 362/116
(58) Field of Search .................................. 429/96–100

(56) References Cited

U.S. PATENT DOCUMENTS

| | | | | |
|---|---|---|---|---|
| 4,431,717 A | * | 2/1984 | Kikuchi | 429/100 |
| 4,628,418 A | * | 12/1986 | Chabria | 362/116 |
| 5,528,460 A | * | 6/1996 | Byrd | 361/752 |
| 5,670,268 A | * | 9/1997 | Mancusi | 429/9 |
| 6,124,056 A | * | 9/2000 | Kimura | 429/100 |
| 6,237,906 B1 | * | 5/2001 | Deans | 269/43 |

* cited by examiner

Primary Examiner—Patrick Ryan
Assistant Examiner—Mark Ruthkosky
(74) Attorney, Agent, or Firm—Philip H. Burrus, IV

(57) ABSTRACT

An apparatus for spacing a battery cell includes a cradle member having a top surface, that defines a first indentation, and an opposite bottom surface. The cradle member also has a first ledge portion and an opposite second ledge portion. At least one first cantilever beam extends from the top surface. The first cantilever beam has a first base portion having a first top end and a spaced-apart first bottom end. The first bottom end is connected to the cradle member adjacent the first ledge portion. The first cantilever beam also has a first flexible elongated arm portion extending from the first top end. The first flexible elongated arm portion is directed toward the indentation and has a length sufficient to exert inwardly-directed radial force in a first direction on the battery cell when the battery cell is placed into the indentation. At least one second cantilever beam extends from the top surface. The second cantilever beam has a second base portion having a second top end and a second bottom end, where the second bottom end is connected to the cradle member adjacent the second ledge portion. The second cantilever beam also has a second flexible elongated arm portion extending from the second top end and directed toward the indentation. The second flexible elongated arm portion has a length sufficient to exert inwardly-directed radial force in a second direction, transverse to the first direction, on the battery cell when the battery cell is placed into the indentation.

11 Claims, 2 Drawing Sheets

TOLERANCE AND SIZE ADAPTIVE SPACER FOR SPACING A BATTERY CELL

BACKGROUND OF THE INVENTION

1. Field of the Invention

The present invention relates to a battery cell spacer and, more specifically, to a spacer that is adaptive to cells of varying tolerance.

2. Description of the Prior Art

Prior art battery cell spacers, such as the spacer 110 shown in FIG. 1, typically include one or more indentations into which fit a corresponding number of cells 102. Such spacers 110 are generally designed to hold a specific diameter of cell. If the cell diameter is greater than a certain tolerance (as in the case of cell 102a), the spacer 110 may prevent the cell 102a from fully resting within the indentation, thereby causing interference during assembly. If the cell diameter is less than a certain tolerance (as in the case of cell 102c), the spacer 110 may allow undue movement of the cell 102c within the spacer 110. Even if the diameter of the cell 102b corresponds exactly to that of the indentation, the cell 102b requires constant inward force, otherwise it could experience movement.

Therefore, there is a need for a spacer that applies constant force on cells of a variety of diameters.

DETAILED DESCRIPTION OF THE INVENTION

Figure 1:
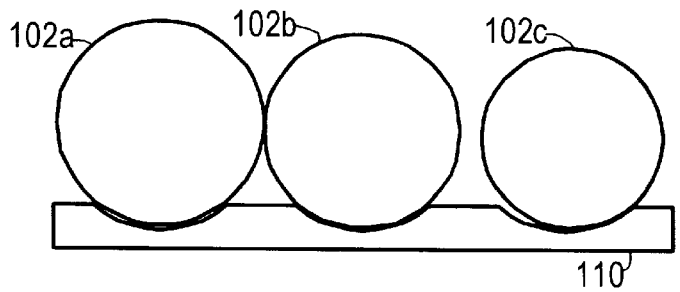
FIG. 1 is an elevational view of a prior art spacer.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one illustrative embodiment of a battery cell 102 spacer 200 according to the invention includes a cradle member 202 having a top surface 206 and an opposite bottom surface 208. The top surface 206 defines a first indentation 204, which could be complimentary in shape to at least a portion of the cell 102. The cradle member also has a first ledge portion 210 and an opposite second ledge portion 230. At least one first cantilever beam 220 extends from the top surface 206. The first cantilever beam 220 has a first base portion 222 having a first top end 224 and a spaced-apart first bottom end 226. The first bottom end 226 is connected to the cradle member 202 adjacent the first ledge portion 210. The first cantilever beam 220 also has a first flexible elongated arm portion 228 extending from the first top end 224 and directed toward the indentation 204. The first flexible elongated arm portion 228 has a length sufficient to exert inwardly-directed radial force in a first direction on the battery cell 102 when it is placed into the indentation 204 (as shown in FIG. 2B).

Similarly, at least one second cantilever beam 240 extends from the top surface 206. The second cantilever beam 240 has a second base portion 242 having a second top end 244 and a second bottom end 246. The second bottom end 246 is connected to the cradle member 202 adjacent the second ledge portion 230. The second cantilever beam 240 also has a second flexible elongated arm portion 248 extending from the second top end 244 and directed toward the indentation 204. The second flexible elongated arm portion 248 has a length sufficient to exert inwardly-directed radial force in a second direction, transverse to the first direction, on the battery cell 102 when it is placed into the indentation 204.

Figure 2A:
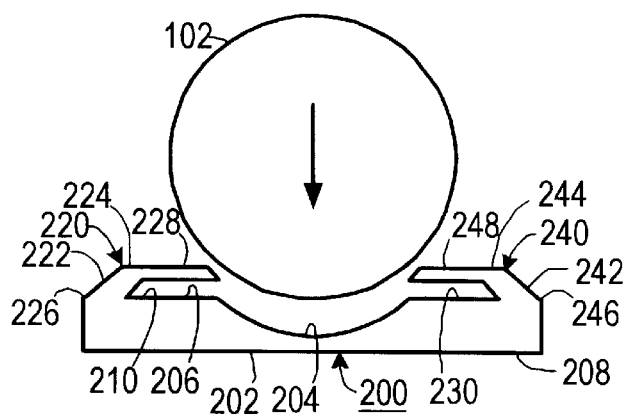
FIG. 2A is an elevational view of a single cell spacer prior to the insertion of a cell.
Figure 2B:
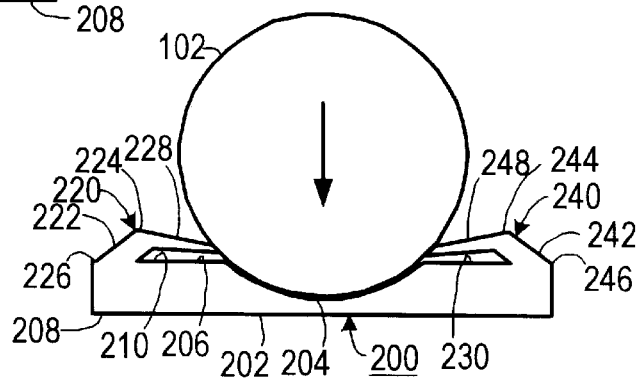
FIG. 2B is an elevational view of the spacer of FIG. 2A after the insertion of a cell.
Figure 2C:
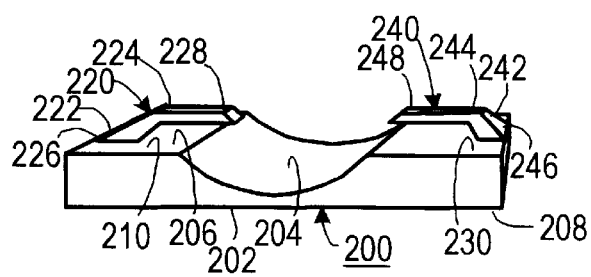
FIG. 2C is a top front perspective view of the spacer of FIG. 2A.

While FIGS. 2A–2C show the cradle member 202, the first cantilever beam 220 and the second cantilever beam 240 as a unitary object, these items could be constructed separately and assembled. Typically, the cradle member 202, the first cantilever beam 220 and the second cantilever beam 240 will be either molded plastic (such as an injection molded thermoplastic) or stamped sheet metal. However, many other construction methods, such as stamping sheet plastic, could be employed without departing from the scope of the invention.

Figure 3:
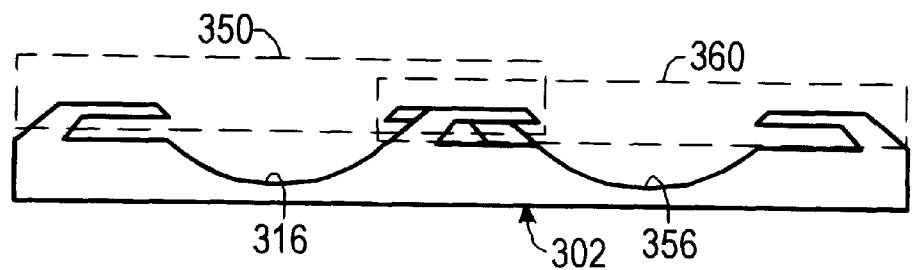
FIG. 3 is an elevational view of a two cell spacer according to the invention.
Figure 4A:
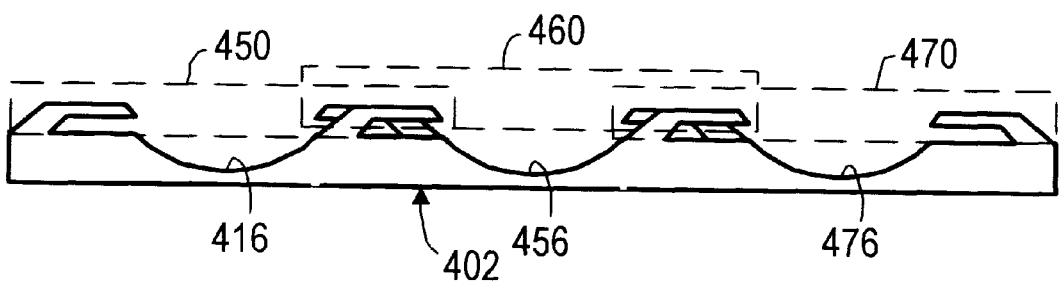
FIG. 4A is an elevational view of a three cell spacer according to the invention.
Figure 4B:
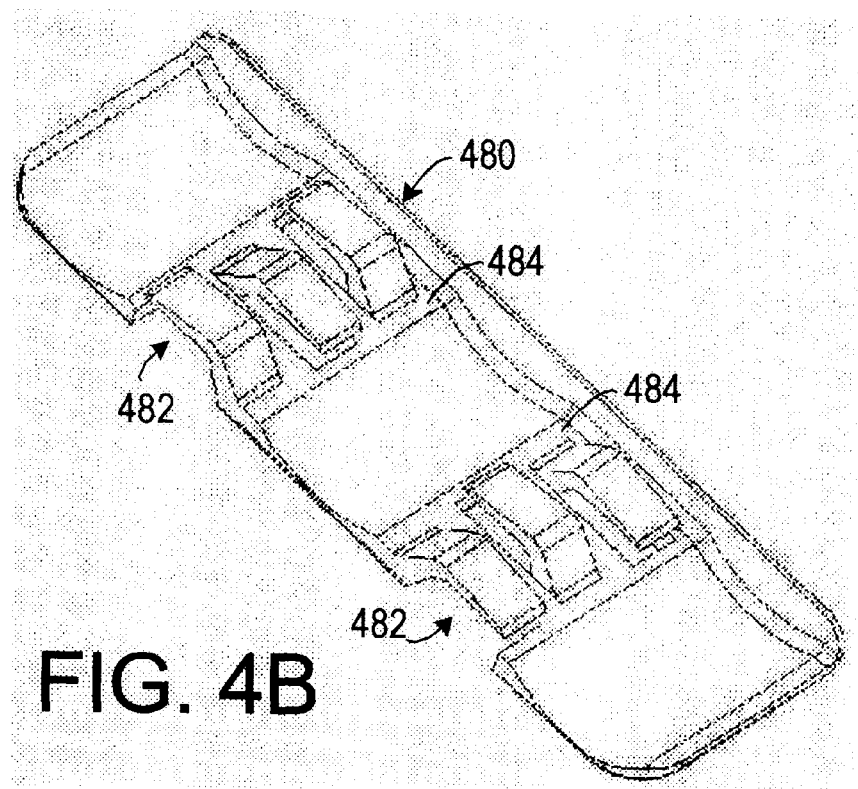
FIG. 4B is an isometric view of a second embodiment of a three cell spacer.

As shown in FIG. 3, one embodiment of the invention is a spacer for holding two cells. Such a spacer includes a cradle member 302 that has two indentations 316 and 356. Disposed about first indentation 316 is a first set of cantilever beams 350 and disposed about the second indentation 356 is a second set of cantilever beams 360. As shown in FIG. 4A, a three cell spacer may be made in which the cradle member 402 includes three indentations 416, 456 and 476, each for receiving a cell therein. Each indentation 416, 456 and 476 has a corresponding pair of cantilever beams 450, 460 and 470 disposed thereabout. As shown in FIG. 4B, one embodiment of the invention is a spacer 480 in which the cantilever beams are all disposed on the interior ledge portions 482. As can be seen from the above-discussed embodiments, a spacer falling within the scope of the invention could have several indentations. Furthermore, several different arrangements of cantilever beams, relative to each indentation may be employed without departing from the scope of the invention.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for spacing a battery cell, comprising:
   a. a cradle member having a top surface and an opposite bottom surface, the top surface defining a first indentation, the cradle member also having a first ledge portion and an opposite second ledge portion;
   b. at least one first cantilever beam extending from the top surface, the first cantilever beam having a first base portion having a first top end and a spaced-apart first bottom end, the first bottom end being connected to the cradle member adjacent the first ledge portion, and a first flexible elongated arm portion extending from the first top end and directed toward the indentation, the first flexible elongated arm portion having a length sufficient to exert inwardly-directed radial force in a first direction on the battery cell when the battery cell is placed into the indentation; and c. at least one second cantilever beam extending from the top surface, the second cantilever beam having a second base portion having a second top end and a second bottom end, the second bottom end being connected to the cradle member adjacent the second ledge portion, and a second flexible elongated arm portion extending from the second top end and directed toward the indentation, the second flexible elongated arm portion having a length sufficient to exert inwardly-directed radial force in a second direction, transverse to the first direction, on the battery cell when the battery cell is placed into the indentation.

2. The apparatus of claim 1, wherein the first indentation is complementary in shape to a portion of a battery cell.

3. The apparatus of claim 1, wherein the cradle member, the first cantilever beam and the second cantilever beam comprise a unitary object.

4. The apparatus of claim 1, wherein the cradle member, the first cantilever beam and the second cantilever beam comprise a molded structure.

5. The apparatus of claim 4, wherein the molded structure comprises an injection molded structure.

6. The apparatus of claim 4, wherein the molded structure comprises a thermoplastic.

7. The apparatus of claim 1, wherein the cradle member, the first cantilever beam and the second cantilever beam comprise a stamped structure.

8. The apparatus of claim 7, wherein the stamped structure comprises sheet metal.

9. The apparatus of claim 7, wherein the stamped structure comprises plastic.

10. The apparatus of claim 1, wherein the cradle member further comprises a second indentation adjacent the second ledge portion and a third ledge portion adjacent the second indentation and opposite the second ledge portion.

11. The apparatus of claim 10, further comprising:

a. at least one third cantilever beam extending from the top surface, the third cantilever beam having a third base portion having a third top end and a third bottom end, the third bottom end being connected to the cradle member adjacent the second ledge portion, and a third flexible elongated arm portion extending from the third top end and directed toward the indentation, the third flexible elongated arm portion having a length sufficient to exert inwardly-directed radial force in a third direction on the battery cell when the battery cell is placed into the indentation; and b. at least one fourth cantilever beam extending from the top surface, the fourth cantilever beam having a fourth base portion having a fourth top end and a fourth bottom end, the fourth bottom end being connected to the cradle member adjacent the third ledge portion, and a fourth flexible elongated arm portion extending from the fourth top end and directed toward the indentation, the fourth flexible elongated arm portion having a length sufficient to exert inwardly-directed radial force in a fourth direction, transverse to third direction, on the battery cell when the battery cell is placed into the indentation.

* * * * *